(12) United States Patent
Yu et al.

(10) Patent No.: US 8,624,876 B2
(45) Date of Patent: Jan. 7, 2014

(54) DISPLAY DEVICE HAVING OPTICAL SENSING FRAME AND METHOD FOR DETECTING TOUCH USING THE SAME

(75) Inventors: Byung-Chun Yu, Gyeonggi-do (KR); Min-Ho Sohn, Gyeonggi-do (KR); Hyung-Uk Jang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 429 days.

(21) Appl. No.: 12/909,388

(22) Filed: Oct. 21, 2010

(65) Prior Publication Data

US 2011/0254809 A1    Oct. 20, 2011

(30) Foreign Application Priority Data

Oct. 22, 2009   (KR) .................... 10-2009-0100588

(51) Int. Cl.
*G06F 3/042* (2006.01)
(52) U.S. Cl.
USPC .......................................... 345/175; 385/131
(58) Field of Classification Search
USPC ................... 178/18.08–18.11; 345/173, 175; 385/129–132, 33–35
See application file for complete search history.

(56) References Cited

U.S. PATENT DOCUMENTS

| | | | | |
|---|---|---|---|---|
| 4,837,430 A | * | 6/1989 | Hasegawa | 250/221 |
| 5,004,908 A | * | 4/1991 | Nakamura | 250/221 |
| 5,914,709 A | * | 6/1999 | Graham et al. | 345/179 |
| 6,587,099 B2 | * | 7/2003 | Takekawa | 345/175 |
| 6,992,659 B2 | * | 1/2006 | Gettemy | 345/173 |
| 2004/0066379 A1 | * | 4/2004 | Ise et al. | 345/175 |
| 2007/0242334 A1 | * | 10/2007 | Selbrede et al. | 359/222 |
| 2008/0106527 A1 | * | 5/2008 | Cornish et al. | 345/176 |
| 2008/0198144 A1 | * | 8/2008 | Shimizu et al. | 345/175 |
| 2008/0278460 A1 | * | 11/2008 | Arnett et al. | 345/175 |
| 2009/0237375 A1 | * | 9/2009 | Khan et al. | 345/175 |
| 2011/0148819 A1 | * | 6/2011 | Yu | 345/175 |
| 2011/0298756 A1 | * | 12/2011 | Kim et al. | 345/175 |
| 2012/0098794 A1 | * | 4/2012 | Kleinert et al. | 345/175 |

FOREIGN PATENT DOCUMENTS

| | | |
|---|---|---|
| CN | 101546239 | 9/2009 |
| KR | 10-2000-0018260 A | 4/2000 |
| KR | 10-2009-0101843 A | 9/2009 |

OTHER PUBLICATIONS

Chinese Office Action with English translation issued in a corresponding patent application on Nov. 30, 2012.
Office Action dated Apr. 26, 2013 issued by the Korean Patent Office for a counterpart Korean patent application.

* cited by examiner

*Primary Examiner* — Alexander Eisen
*Assistant Examiner* — Sanjiv D Patel
(74) *Attorney, Agent, or Firm* — Morgan, Lewis & Bockius LLP

(57) ABSTRACT

A display device having an optical sensing frame, including a display panel; at least one waveguide unit arranged at two adjacent sides of the display panel, the waveguide unit having a stacked structure, the stacked structure including a light-emitting layer, and a light-receiving layer to receive reflected light, and a plurality of retroreflectors arranged at opposing sides of the waveguide unit.

17 Claims, 6 Drawing Sheets

DISPLAY DEVICE HAVING OPTICAL SENSING FRAME AND METHOD FOR DETECTING TOUCH USING THE SAME

This application claims the benefit of Korean Patent Application No. 10-2009-0100588, filed on Oct. 22, 2009, which is hereby incorporated by reference.

BACKGROUND OF THE INVENTION

1. Field of the Invention

The present invention relates to a display device, and more particularly to a display device with an optical sensing frame wherein a waveguide unit having a double-layer structure including a light-receiving layer and a light-emitting layer is applied to realize structural simplification and increase an active area, and a method for detecting touch using the same.

2. Discussion of the Related Art

In general, a touch panel forms an interface between information and communication devices using a variety of displays and a user. The touch panel is an input device which interfaces with an apparatus by directly contacting a screen by hand or with a pen. A touch panel is an input apparatus which can be manipulated by contacting a button displayed on a display with a user's finger. Accordingly, a touch panel is easily utilized by users of all ages. Touch panels are utilized in a variety of applications including issuing machines in banks or government offices, various medical apparatuses, electronic tour guides, and electronic traffic guides.

Based on the manner in which touch is sensed, touch panels are divided into resistive touch panels, micro capacitive touch panels (glasses), ultrasonic touch panels (glasses), infrared touch panels, etc.

First, the resistive touch panel is composed of two conductive transparent layers, i.e., a lower layer made of a glass or plastic coated with a conductive material and an upper layer made of a film coated with a conductive material. The two layers are electrically isolated by a predetermined distance through a micro-printed spacer. In accordance with the resistive touch panel, when a predetermined voltage is applied to the two layers coated with a conductive material and an upper plate is touched by hand or with a pen, an upper plate (X axis) and a lower plate (Y axis) undergo variations in resistance depending on the position of touch, and a controller present therein calculates the positions of the upper plate (X axis) and lower plate (Y axis) that undergo resistance variation to display X and Y coordinates on a screen, and data may be inputted by the touch screen.

The micro capacitive touch panel includes a transparent glass sensor thinly coated with a conductive material. The conductive coating layer includes electrode patterns finely printed along an edge of the conductive coating layer. A protective coating film made of a transparent glass is also applied in close contact with an upper side of the conductive layer to protect and enclose the glass sensor. The micro capacitive touch panel operates such that a predetermined voltage is applied to a glass screen and the electrode patterns form a low voltage field on a surface of the touch sensor through the conductive layer. Therefore, when the user touches the screen with his or her finger, a micro-amperage current is generated at the touched portion. Further, a touch screen controller can determine the touched portion through proportional calculations using the amperage of the current because the current from each corner is proportional to a distance from the corner to the finger.

The ultrasonic wave touch panel is made entirely of glass. Therefore, as compared to other touch screens, in which the lifespan can be reduced via even minor scratches or abrasions on the surface, the ultrasonic wave touch panel is not influenced by surface damage or abrasion. Further, in the ultrasonic wave touch panel, a touch screen controller transmits 5 MHz electric signals to a transmitting transducer which generates ultrasonic waves. The generated ultrasonic waves are then passed through a panel surface by reflected lines. Therefore, when the user touches a surface of the touch screen, a part of the ultrasonic waves passing through the touched portion are absorbed by the user and loss of signals is transmitted to the controller through received signals and a digital map. Then, the controller calculates the coordinate values of the portions where the variation in the signals occurs. The above serial operations are performed with respect to the X-axis and the Y-axis, independently.

The infrared type touch panel uses the straightness effect of infrared rays, i.e., uses a principle in that infrared rays do not advance beyond an obstacle placed ahead of the rays. In more detail, infrared rays emitted in horizontal and vertical directions are obstructed at a portion touched by the user, and a controller determines the coordinate values of the X-axis and Y-axis of the infrared-obstruction. Thus, the infrared touch panel detects the touched portion through interruption of the infrared ray at a front side of the touch panel. Further, infrared rays are emitted from one side of the X-axis and the Y-axis and received at the other side of the X-axis and the Y-axis, thereby forming an invisible infrared matrix.

Although each type of panel has different advantages, mentioned above, infrared touch panels currently attract much attention because they require less pressure to be applied to the touch panels. Next, a related art infrared type touch panel will be described with reference to the annexed drawings.

FIG. 1 is a plan view illustrating an infrared touch panel according to the related art.

As shown in FIG. 1, the related art infrared touch panel, as mentioned above, forms an infrared ray (IR) matrix, a light-emitting portion 19 provided with a light-emitting waveguide 10 at two sides adjacent to a touch panel surface 14, and a light-receiving portion 20 provided with a light-receiving waveguide 16 at the other adjacent two sides.

The light-emitting portion 19 and the light-receiving portion 20 are provided with lenses 12 and 15 connected to the light-emitting and light-receiving waveguides 10 and 16, respectively, to straightly transfer light emitted and received through the respective waveguides to the matrix. The light-emitting waveguide 10 of the light-emitting portion 19 is provided at one side thereof with an LED light source 11 to transfer light thereto and a light splitter 18. The light-receiving portion 20 is provided at one side thereof with a photo sensor 17, connected to the light-receiving waveguide 16, to detect presence of touch. Here, the photo sensor 17 is provided with a photo sensor array to decide coordinates of a user's touch since photo sensor 17 is connected to the light-receiving waveguide 16 which is connected to both the X-axis and Y-axis.

In such a structure, the light-emitting portion 19 and the light-receiving portion 20 are provided at one side thereof with a light source 11 and a photo sensor 17, respectively. To connect the light source 11 and the photo sensor 17 to the waveguides 10 and 16 so as to transfer light in X-axis and Y-axis directions, line lengths of the waveguide far from the light source 11 and the photo sensor 17 as well as areas of the light-emitting portion 19 and the light-receiving portion 20 must inevitably be increased.

The aforementioned related art infrared touch panel has the several disadvantages. First, the light-emitting portion or light-receiving portion provided with the waveguide and lens should be arranged at four sides of the touch panel plane. For touch sensing, all configurations should be provided throughout all edges of the touch panel. Accordingly, location of elements is complicated and lengths of lines are increased. Due to these disadvantages, electric noise or EMI generated from display devices may affect touch systems. Second, the light-receiving portion and the light-emitting portion should be provided at two adjacent sides which complicates the structure and reduces an active area. Third, as the area of the touch panel increases, the number of pixels also increases, and more waveguides and lenses are required. An active area of the touch panel of a predetermined size is decreased. The touch panel at two respective sides thereof with the light-emitting portion and the light-receiving portion does not reflect active area efficiency of a display panel arranged in a lower region. As a result, the related art infrared touch panel is inapplicable to large-area display devices. In addition, the recent trend toward thin bezels inhibits realization of touch module-integrated displays due to the volume of the touch module.

SUMMARY OF THE INVENTION

Accordingly, the present invention is directed to a display device having optical sensing frame and method for detecting touch using the same that substantially obviates one or more problems due to limitations and disadvantages of the related art.

An object of the present invention is to provide an improved display device with an optical sensing frame, and a method for detecting touch using the same.

Another object of the present invention is to provide an improved display device with an optical sensing frame with an increased active area, and a method for detecting touch using the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the display device having optical sensing frame and method for detecting touch using the same includes a display device having an optical sensing frame, comprising a display panel, at least one waveguide unit arranged at two adjacent sides of the display panel, the waveguide unit having a stacked structure, the stacked structure including a light-emitting layer, and a light-receiving layer to receive reflected light, and a plurality of retroreflectors arranged at opposing sides of the waveguide unit.

In another aspect, the display device having optical sensing frame and method for detecting touch using the same includes a method for fabricating a display device having optical sensing frame, comprising the steps of providing a display panel, providing at least one waveguide unit arranged at two adjacent sides of the display panel, the waveguide unit having a stacked structure, the stacked structure including a light-emitting layer, and a light-receiving layer to receive reflected light, and providing a plurality of retroreflectors arranged at opposing sides of the waveguide unit.

In another aspect, the display device having optical sensing frame and method for detecting touch using the same includes a method for detecting touch of a display device with an optical sensing frame, the method comprising the steps of preparing a display device having a waveguide unit arranged at adjacent two sides of the display panel, a retroreflector arranged at the remaining two sides of the display panel and a case to encase the display panel, the waveguide unit and the retroreflector, wherein the waveguide unit has a stacked structure including a light-emitting layer to emit infrared light and a light-receiving layer to receive the reflected light and thus detect touch, touching a portion of the display panel using an imput element, and allowing the waveguide unit to sense variations in reception amount of reflected light caused by the intervention of the input element in the touched portion and allowing the input element to block emitted light to prevent retro-reflection and thus detect presence of touch and the position thereof.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the embodiments of the present invention, examples of which are illustrated in the accompanying drawings. Hereinafter, a display device with an optical sensing frame and a method for detecting touch using the same according to the present invention will be described with reference to the annexed drawing.

Figure 1:
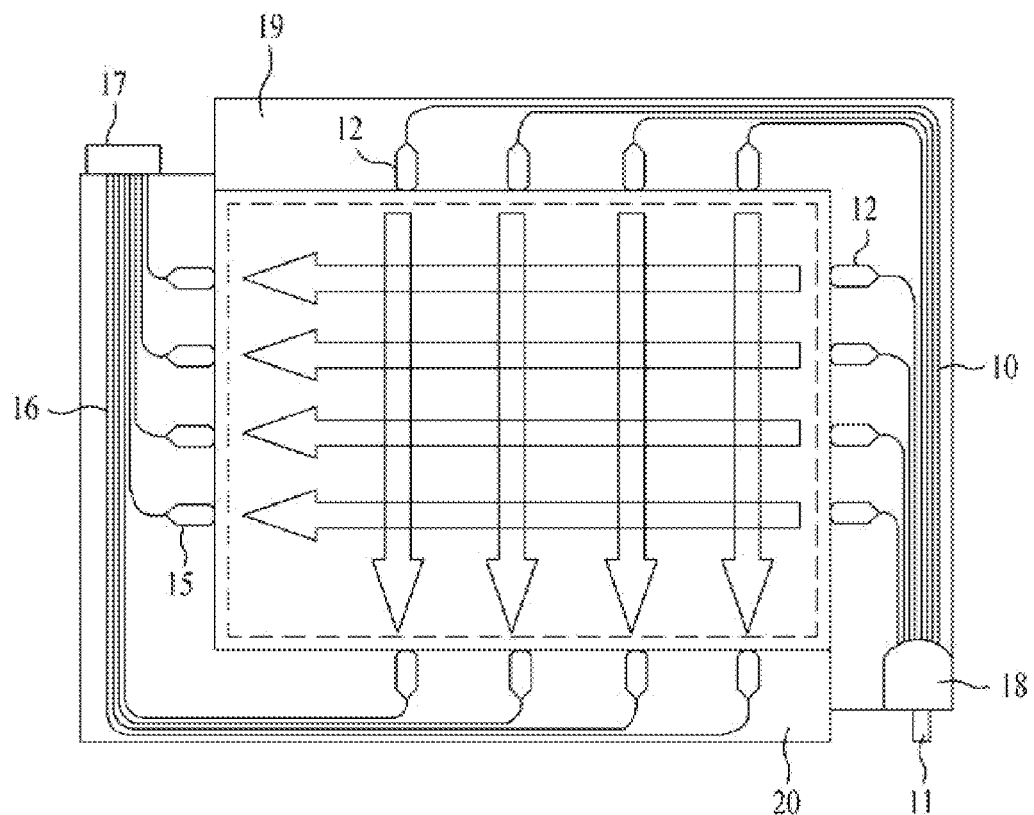
FIG. 1 is a plan view illustrating an infrared touch panel according to the related art.
Figure 2:
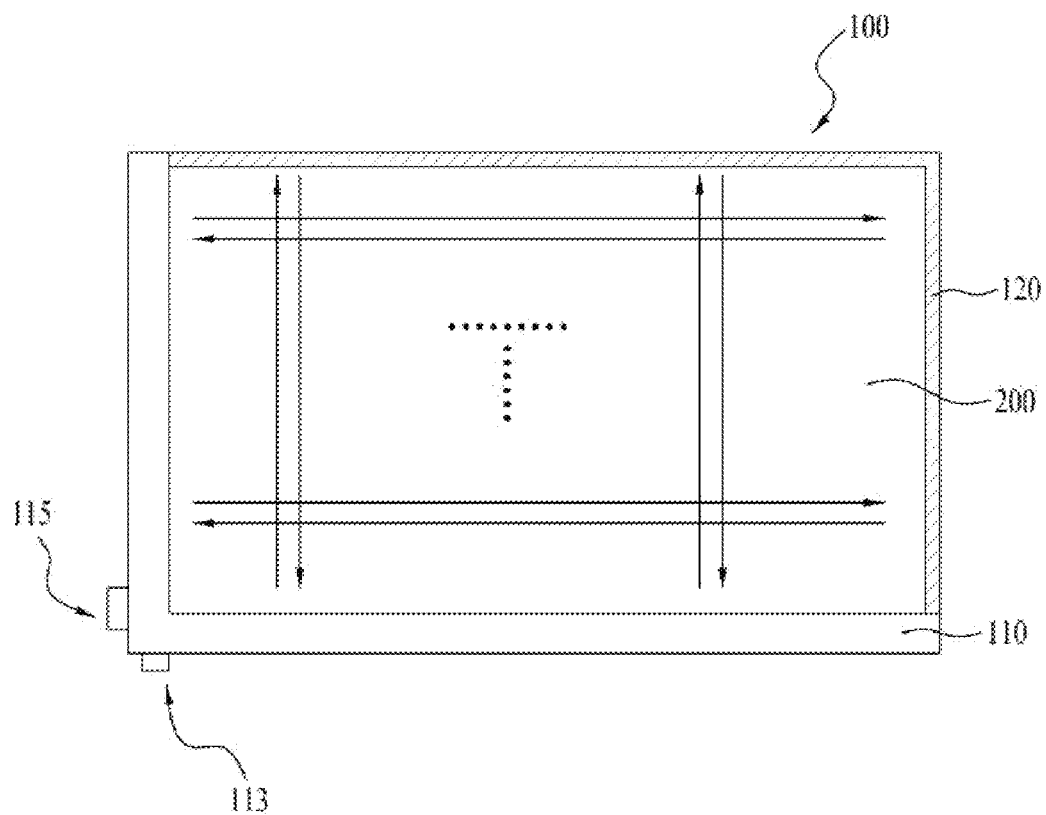
FIG. 2 is a plan view illustrating an exemplary display device with an optical sensing frame according to the present invention.
Figure 3:
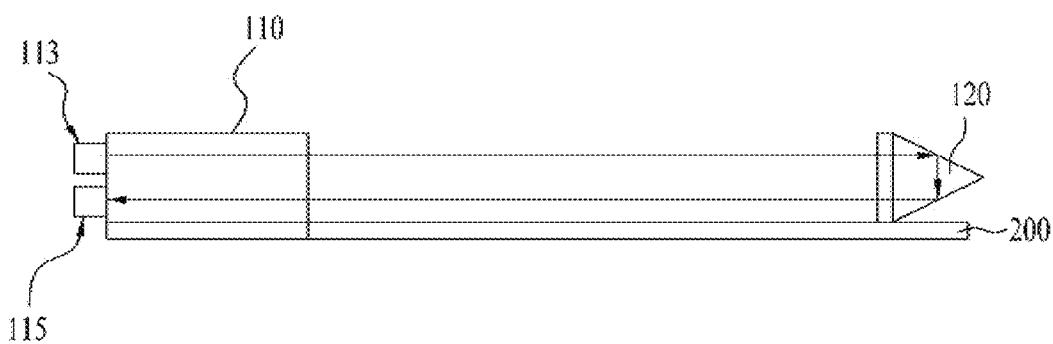
FIG. 3 is a sectional view illustrating the exemplary display device of FIG. 2.

FIG. 2 is a plan view illustrating an exemplary display device with an optical sensing frame according to the present invention. FIG. 3 is a sectional view illustrating the exemplary display device of FIG. 2.

As shown in FIGS. 2 and 3, the display device with an optical sensing frame 100 includes a display panel 200 having a rectangular structure with four plane sides, a waveguide unit 110 arranged on adjacent two sides of the display panel 200 having a stacked structure including a light-emitting layer (represented by reference numeral "111" in FIG. 4) emitting infrared light and a light-receiving layer (represented by reference numeral "112" in FIG. 4) receiving reflected light and detecting touch, a retroreflector unit 120 arranged on the remaining two sides of the display panel 200, and a case (not shown) encasing the display panel 200, the waveguide unit 110, and the retroreflector unit 120. The light-emitting layer 111 and the light-receiving layer 112 may be stacked in a reverse position and may each independently have a stacked structure including two or more layers, if desired.

As shown in FIG. 2, light is emitted straight from the waveguide unit 110 in a plurality of portions in X and Y axial directions. The retroreflector unit 120 reflects the received light in a reverse direction again. That is, the retroreflector unit 120 receives straight light allowing the light to be straightly transmitted to the waveguide unit.

When a predetermined portion of the display device with an optical sensing frame 100 is touched by an object, the object blocks passage of straight light in the corresponding portion due to absorbance, scattering, or reflection, etc. Thus, the received light is prevented from being transmitted to the retroreflector. The waveguide unit 110 determines the reception of light and variations thereof. Thus, the presence of the touch and the corresponding position thereof is detected.

Figure 4:
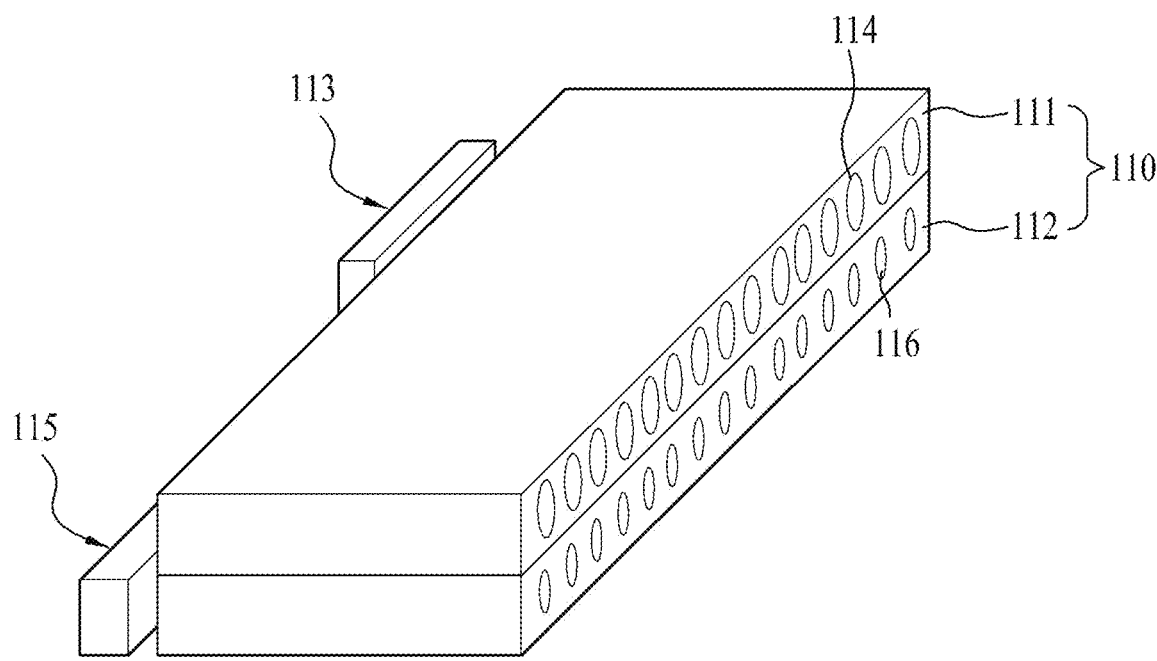
FIG. 4 is a perspective view illustrating the exemplary waveguide unit of FIG. 2.

FIG. 4 is a perspective view illustrating the exemplary waveguide unit of FIG. 2.

As shown in FIG. 4, the waveguide unit 110 includes the light-emitting layer 111 and the light-receiving layer 112 which are illuminated in this order. In particular, the light-emitting layer 111 of the waveguide unit 110 is provided at one side thereof with an infrared LED 113 to emit infrared light, a light splitter (not shown) to distribute light, and a plurality of optical fibers 114 to allow light split from the infrared LED 113 to be transmitted straight in a plurality of portions to X and Y axes.

The light-receiving layer 112 of the waveguide unit 110 includes a plurality of optical fibers 116 receiving light reflected from the retroreflector unit 120 and a line photo sensor 115, connected to one side of the optical fibers 116, to detect the presence of touch using light transmitted from the optical fibers 116. In addition, an optical efficiency lens may also be provided adjacent to the sides of the display panel 200 at which the optical fibers 116 and 114 are arranged. In one embodiment, a first type of optical efficiency lens may be connected to each of the plurality of optical fibers 114, and a second type of optical efficiency lens may be connected to each of the plurality of optical fibers 116. The first type of optical lens may be a light focusing optical lens, and the second type of optical lens may be a narrow viewing angle optical lens.

Figure 5:
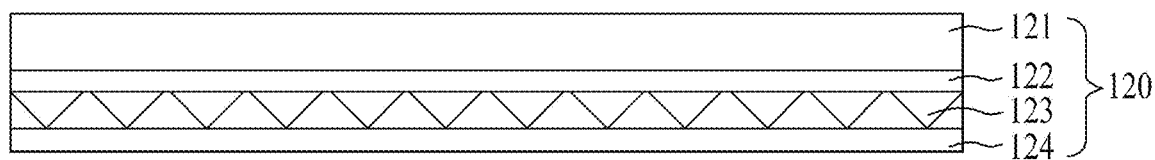
FIG. 5 is a sectional view illustrating the exemplary retroreflector unit of FIG. 2.
Figure 8:
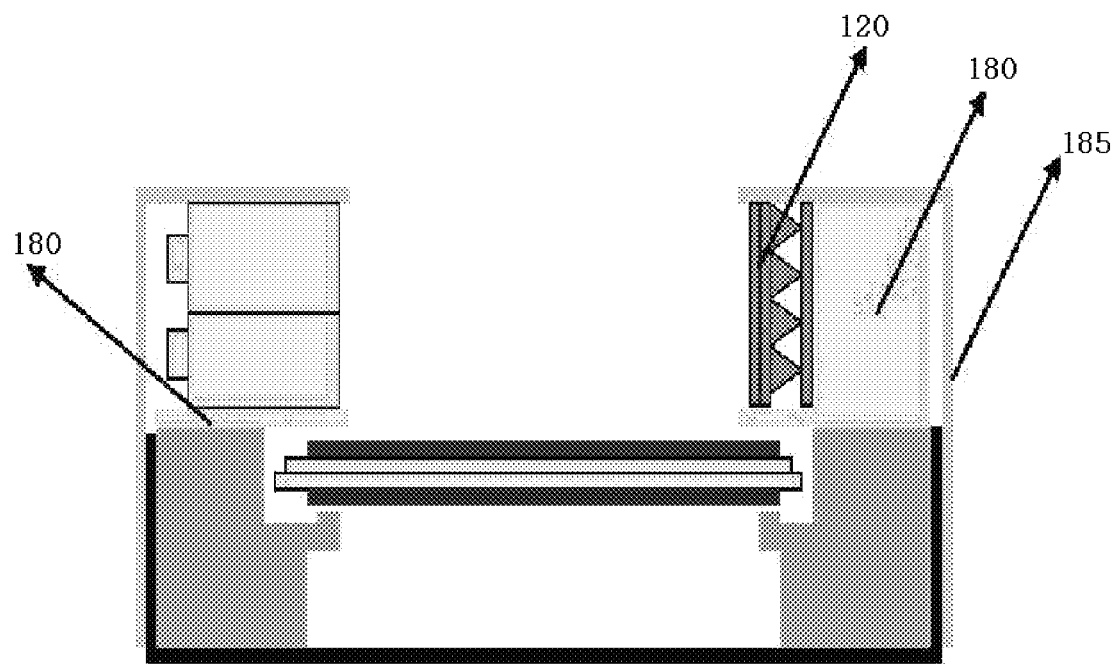
FIG. 8 is a sectional view illustrating an exemplary liquid crystal display device including the optical sensing frame according to the present invention.

FIG. 5 is a sectional view illustrating the exemplary retroreflector unit of FIG. 2. FIG. 8 is a sectional view illustrating an exemplary liquid crystal display device comprising the optical sensing frame according to the present invention.

As shown in FIG. 5, the retroreflector unit 120 includes an optical filter 121 to transmit only infrared rays, a retroreflector 123 to reflect the received light, and a first adhesive layer 122, interposed between the optical filter 121 and the retroreflector 123, to adhere the optical filter 121 and to the retroreflector 123. In addition, the retroreflector unit 120 further includes a second adhesive layer 124 arranged under the retroreflector 123. In the second adhesive layer 124, a case top (185 of FIG. 8) used for a case is provided at an inner side thereof with a line supporter (180 of FIG. 8) supporting the retroreflector unit 120. Also, the retroreflector unit 120 may be adhered to one side of the supporter 180.

Figure 6:
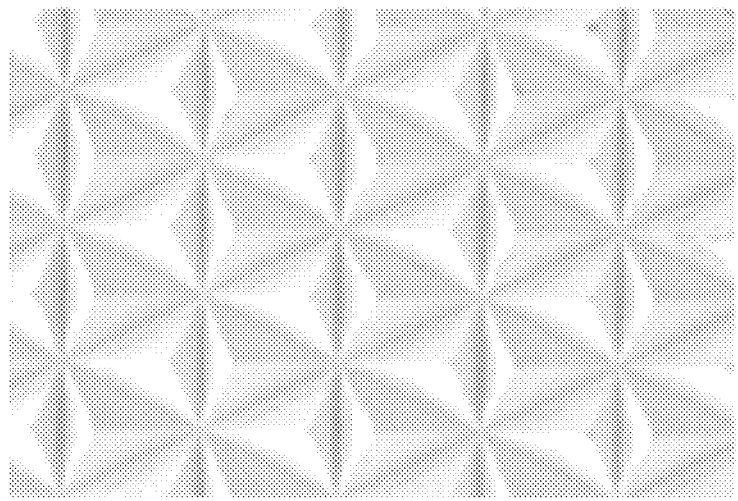
FIG. 6 is a top view illustrating the exemplary retroreflector unit of FIG. 2.

FIG. 6 is a top view illustrating the exemplary retroreflector of FIG. 2. As shown in FIG. 6, the retroreflector 123 is in the form of a cube-corner, like a micro prism. The light angle is in the range of 0 to 65 degrees with excellent rectoreflection efficiency.

Figure 7:
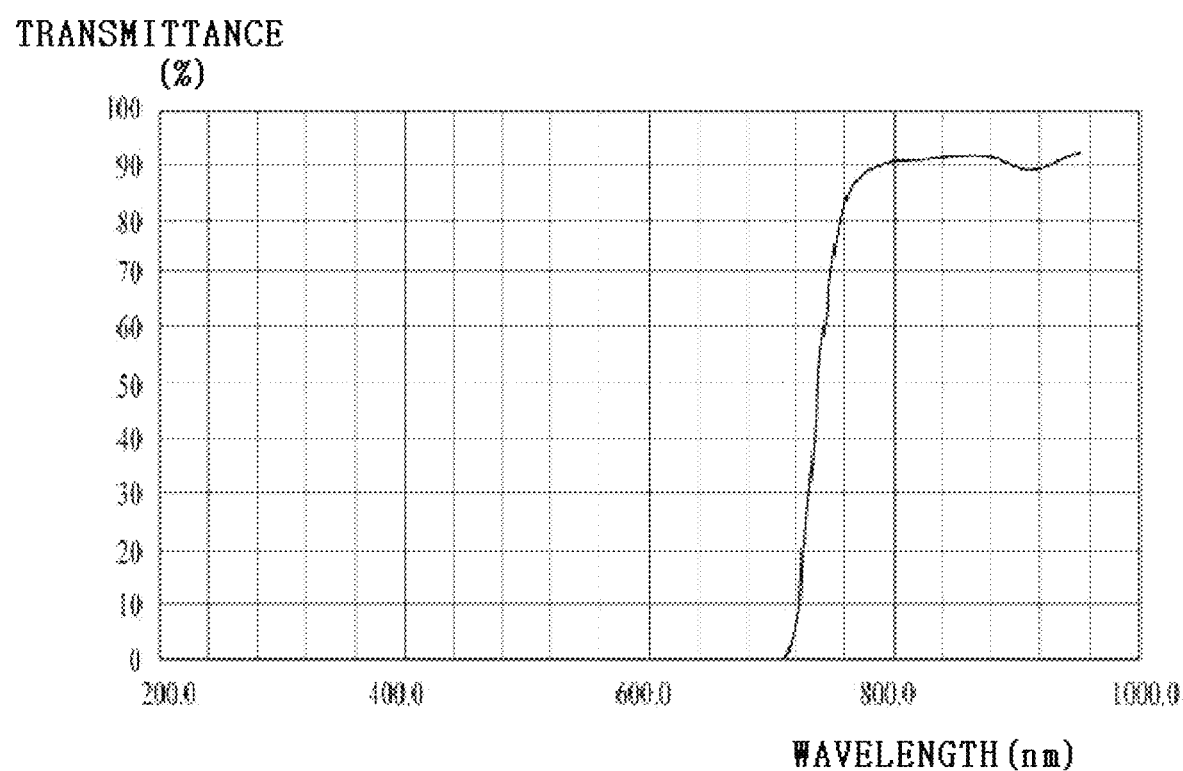
FIG. 7 is a graph showing transmittance of an exemplary optical filter of the exemplary retroreflector unit of FIG. 5.

FIG. 7 is a graph showing transmittance of an exemplary optical filter of the exemplary retroreflector unit of FIG. 5.

As shown in FIG. 7, the optical filter 121 transmits only light above infrared rays and blocks the remaining light above visible rays. A black material (visible ray-absorbing material) may be applied in order to block visible rays. For example, the optical filter 121 may have a cut-off frequency of about 700 nm.

The optical filter 121 may be made of an acrylic resin. For example, the acrylic resin may be polymethylmethacrylate (PMMA) or polycarbonate. Alternatively, the optical filter 121 may contain glass.

Meanwhile, the display panel used for the display device provided with an optical sensing frame may be selected from liquid crystal panels, PDP panels, organic light-emitting display panels, and electrophoretic panels. The liquid crystal panel is provided with an additional light source in a lower region thereof.

Such a display device requires a material to encase the display panel 200, the waveguide unit 110 arranged in the periphery of the display panel 200, and the retroreflector unit 120. Also, the waveguide unit 110 and the retroreflector unit 120 may also be included in the case.

For example, when the display panel is a liquid crystal panel which includes a first substrate, a second substrate, and a liquid crystal layer filled therebetween, a frame-type case top 185, which overlaps the periphery and side of the liquid crystal panel, is provided. The display panel includes a case top 185 to shield the waveguide unit 110 and the retroreflector unit 120 which are arranged at the peripheries of the liquid crystal panel.

Here, the retroreflector unit 120 is adhered to an inner side of the case top 185, and the waveguide unit 110 is adhered to or structurally inserted into other inner side of the case top 185 to realize an integrated structure. The waveguide unit 110 having a double-layer stacked structure including the light-emitting layer 111 and the light-receiving layer 112 is applied to two adjacent sides of the display panel and the retroreflector is applied to the remaining two sides thereof to integrate the optical sensing frame in a display module without increasing a non-active area.

In particular, the retroreflector is composed of only a film or an adhesive layer, without any reflective lens, line, or element. Accordingly, the width of the retroreflector can be significantly reduced, as compared to the waveguide unit, and the thickness thereof can be reduced to 1,000 μm or less. For this reason, the retroreflector is useful for slim display devices. As a result, a borderless structure can be realized.

Also, the double-layer stacked structure waveguide unit including the light-emitting layer 111 and the light-receiving layer 112 is advantageous in that the infrared LED and the line photo sensor connected to the light-emitting layer 111 and the light-receiving layer 112, respectively, can be readily located in each block and the waveguide unit is useful for large display devices. For example, the line photo sensor is located in each block comprising pixels corresponding to its resolution. In addition, the infrared LED may be located such that luminance efficiency of the infrared LED and reflection efficiency, in which the retroreflector unit 120 reflects light received from the LED, are maintained at a predetermined level.

The liquid crystal display device senses touch in the following manner. The infrared LED 113 present in the light-emitting portion 111 of the waveguide unit 110 emits infrared light and the retroreflector unit 120 retro-reflects the infrared light to an opposite side in order to transfer the light to the light-receiving portion 112 of the waveguide unit 110, thereby allowing the line photo sensor 115 of the light-receiving portion 112 to sense the reflected and transmitted light. At this time, when the device is touched by an input, such as a hand or pen, transfer of emitted and reflected light is blocked in the corresponding portion due to the intervention of the input means. Accordingly, presence of touch, the portion at which light amount varies, and the corresponding position (X and Y coordinates), connected through optical fibers, as the touched portion can be considered by sensing variation in reception amount of reflected light read from the line photo sensor 115. That is, this waveguide unit 110 senses variations of absorbed, scattered, and reflected light generated by respective elements based on inherent reflectivity of an input in a touched region and blocks light emitted by the input to prevent retro-reflection and thus realize presence of touch and regions thereof.

The display device with an optical sensing frame according to the present invention has the following advantages. First, the waveguide unit having a double-layer stacked structure including the light-receiving layer and the light-emitting layer is applied to two adjacent sides of the display panel and the retroreflector unit is applied to the remaining two sides thereof, to integrate the optical sensing frame in a display module. Second, the retroreflector is applied to the sides of the display panel, which face the waveguide, without applying any reflective lens to the waveguide, thus eliminating the necessity of using any reflective lens and elements connected thereto and simplifying configurations for touch sensation. Third, in the case of a large display device, the display panel may be partitioned into a plurality of blocks and the infrared LED and the line photo sensor may be located in each block. The line photo sensor senses retroreflection of emitted light, or the touch object blocks emitted light to prevent transfer of the light to the retroreflector. Accordingly, the presence of touch can be detected by sensing whether light is not transmitted to the retroreflector unit and thus retroreflection does not occur. Accordingly, the display panel is useful for large display devices. Fourth, as compared to related art display devices wherein a waveguide, a lens, and a sensor or a light source are provided in a light-receiving portion and a light-emitting portion, separately, the display device of the present invention, wherein a waveguide unit is applied to two sides of the display panel and a retroreflector having a simple structure is applied to the remaining two sides thereof, utilizes only optical elements without locating any electric lines, thus simplifying design of instruments, reducing an area of instruments present in the edge of the optical sensing frame, and finally realizing a display device with an approximately borderless structure. Fifth, the number of lenses connected to the waveguide is decreased, and fabrication costs are reduced.

It will be apparent to those skilled in the art that various modifications and variations can be made in the display device having optical sensing frame and method for detecting touch using the same of the present invention without departing from the spirit or scope of the invention. Thus, it is intended that the present invention cover the modifications and variations of this invention provided they come within the scope of the appended claims and their equivalents.

What is claimed is:

1. A display device having an optical sensing frame, comprising:
    a display panel;
    at least one waveguide unit arranged at two adjacent sides of the display panel, the waveguide unit having a stacked structure, the stacked structure including a light-emitting layer, and a light-receiving layer to receive reflected light;
    a retroreflector unit including a plurality of retroreflectors arranged at opposing sides of the waveguide unit; and
    a case enclosing the display panel, the waveguide unit, and the plurality of retroreflectors,
    wherein the case includes a case top portion on the display panel, each of the waveguide unit and the retroreflector unit disposed between the case top portion and the display panel and overlapping a portion of the display panel, wherein the case top portion shields the waveguide unit and the retroreflector unit; and
    wherein the light-emitting layer includes a first plurality of optical fibers, each of the first plurality of optical fibers being connected to a first type of optical lens, and the light-receiving layer includes a second plurality of optical fibers, each of the second plurality of optical fibers being connected to a second type of optical lens,
    and the first type of optical lens is a light focusing optical lens, and the second type of optical lens is a narrow viewing angle optical lens.

2. The display device according to claim 1 wherein the light-emitting layer emits infrared light.

3. The display device according to claim 1 wherein the plurality of retroreflectors operate to return reflected light to the light receiving layer.

4. The display device according to claim 1 wherein light emitted from the first plurality of optical fibers of the light emitting layer is respectively received by the corresponding second plurality of optical fibers of the light receiving layer.

5. The display device according to claim 1, wherein a first supporter is disposed between the waveguide unit and the display panel and a second supporter is disposed between the retroreflector unit and the display panel.

6. The display device according to claim 1, wherein the light-emitting layer of the waveguide unit comprises:
    an infrared LED to emit infrared light;
    a light splitter to distribute light emitted from the infrared LED; and
    the plurality of optical fibers allowing light split from the infrared LED to be transmitted along X and Y axes.

7. The display device according to claim 1, wherein the light-receiving layer of the waveguide unit comprises:
    the plurality of optical fibers to receive light from the retroreflector; and
    at least one optical detector connected to the plurality of optical fibers.

8. The display device according to claim 1, wherein the retroreflector comprises:
    an optical filter layer to remove light received from a source other than the light-emitting layer; and
    a retroreflector prism layer to reflect light received from the light-emitting layer.

9. A method for fabricating a display device having an optical sensing frame, comprising:
    providing a display panel;
    providing at least one waveguide unit arranged at two adjacent sides of the display panel, the waveguide unit having a stacked structure, the stacked structure including a light-emitting layer, and a light-receiving layer to receive reflected light;
    providing a retroreflector unit including a plurality of retroreflectors arranged at opposing sides of the waveguide unit; and
    providing a case enclosing the display panel, the waveguide unit, and the plurality of retroreflectors, wherein the case includes a case top portion on the display panel, each of the waveguide unit and the retroreflector unit disposed between the case top portion and the display panel and overlapping a portion of the display panel, wherein the case top portion shields the waveguide unit and the retroreflector unit, and wherein the light-emitting layer includes a first plurality of optical fibers, each of the first plurality of optical fibers being connected to a first type of optical lens, and the light-receiving layer includes a second plurality of optical fibers, each of the second plurality of optical fibers being connected to a second type of optical lens, and the first type of optical lens is a light focusing optical lens, and the second type of optical lens is a narrow viewing angle optical lens.

10. The method for fabricating a display device according to claim 9, wherein the light-emitting layer emits infrared light.

11. The method for fabricating a display device according to claim 9, wherein the plurality of retroreflectors operate to return reflected light to the light receiving layer.

12. The method for fabricating a display device according to claim 9, wherein light emitted from the first plurality of optical fibers of the light emitting layer is respectively received by the corresponding second plurality of optical fibers of the light receiving layer.

13. The method for fabricating a display device according to claim 9, wherein a first supporter is disposed between the waveguide unit and the display panel and a second supporter is disposed between the retroreflector unit and the display panel.

14. The method for fabricating a display device according to claim 9, wherein the light-emitting layer of the waveguide unit is fabricated by:

providing an infrared LED to emit infrared light;
providing a light splitter to distribute light emitted from the infrared LED; and
providing the plurality of optical fibers allowing light split from the infrared LED to be transmitted along X and Y axes.

15. The method for fabricating a display device according to claim 9, wherein the light-receiving layer of the waveguide unit is fabricated by:

providing the plurality of optical fibers to receive light from the retroreflector; and
providing at least one optical detector connected to the plurality of optical fibers.

16. The method for fabricating a display device according to claim 9, wherein the retroreflector is fabricated by:

providing an optical filter layer to remove light received from a source other than the light-emitting layer; and
providing a retroreflector prism layer to reflect light received from the light-emitting layer.

17. A method for detecting touch of a display device with an optical sensing frame, the method comprising:

preparing a display device having a waveguide unit arranged at adjacent two sides of the display panel, a retroreflector arranged at the remaining two sides of the display panel and a case to encase the display panel, the waveguide unit and the retroreflector, wherein the waveguide unit has a stacked structure including a light-emitting layer to emit infrared light and a light-receiving layer to receive the reflected light and thus detect touch, wherein the case includes a case top portion on the display panel, each of the waveguide unit and the retroreflector disposed between the case top portion and the display panel and overlapping a portion of the display panel;

touching a portion of the display panel using an input element; and allowing the waveguide unit to sense variations in reception amount of reflected light caused by the intervention of the input element in the touched portion and allowing the input element to block emitted light to prevent retro-reflection and thus detect presence of touch and the position thereof, wherein the light-emitting layer includes a first plurality of optical fibers, each of the first plurality of optical fibers being connected to a first type of optical lens, and the light-receiving layer includes a second plurality of optical fibers, each of the second plurality of optical fibers being connected to a second type of optical lens, and the first type of optical lens is a light focusing optical lens, and the second type of optical lens is a narrow viewing angle optical lens.

* * * * *